(12) United States Patent
Shin

(10) Patent No.: US 12,391,300 B1
(45) Date of Patent: Aug. 19, 2025

(54) STEERING SYSTEM FOR VEHICLE

(71) Applicant: HL MANDO CORPORATION, Gyeonggi-do (KR)

(72) Inventor: Woo Jin Shin, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/927,778

(22) Filed: Oct. 25, 2024

(30) Foreign Application Priority Data

May 7, 2024 (KR) .................. 10-2024-0059810

(51) Int. Cl.
*B62D 1/19* (2006.01)
*B62D 1/184* (2006.01)

(52) U.S. Cl.
CPC ............. *B62D 1/192* (2013.01); *B62D 1/184* (2013.01)

(58) Field of Classification Search
CPC ................................ B62D 1/192; B62D 1/184
See application file for complete search history.

(56) References Cited

U.S. PATENT DOCUMENTS

| | | | | |
|---|---|---|---|---|
| 8,375,822 B2 * | 2/2013 | Ridgway | ............... | B62D 1/195 280/775 |
| 8,555,745 B2 * | 10/2013 | Inoue | .................... | B62D 1/184 280/775 |
| 10,494,011 B2 * | 12/2019 | Anspaugh | ............. | B62D 1/184 |
| 10,654,514 B2 * | 5/2020 | Shiroishi | ............... | B62D 1/184 |
| 10,717,457 B2 * | 7/2020 | Dubay | ..................... | B62D 1/19 |
| 2010/0300238 A1 * | 12/2010 | Ridgway | ............... | B62D 1/192 74/493 |
| 2013/0205935 A1 * | 8/2013 | Buzzard | ................. | B62D 1/184 74/495 |
| 2015/0128752 A1 * | 5/2015 | Buzzard | ................. | B62D 1/195 188/377 |
| 2019/0202488 A1 * | 7/2019 | Lee | ........................ | B62D 1/195 |
| 2020/0180676 A1 * | 6/2020 | Kwon | .................... | B62D 1/185 |

FOREIGN PATENT DOCUMENTS

| | | | | |
|---|---|---|---|---|
| CN | 117881590 A | * | 4/2024 | ............. B62D 1/184 |
| JP | 6941542 B2 | | 9/2021 | |
| KR | 10-2076014 B1 | | 2/2020 | |
| KR | 102314280 B1 | * | 10/2021 | |

* cited by examiner

*Primary Examiner* — Drew J Brown
(74) *Attorney, Agent, or Firm* — WOMBLE BOND DICKINSON (US) LLP

(57) ABSTRACT

Collision load is reliably absorbed by preventing any abnormal motion in which the collision load is not absorbed by a bending plate.

20 Claims, 5 Drawing Sheets

STEERING SYSTEM FOR VEHICLE

CROSS REFERENCE TO RELATED APPLICATION

This application claims priority from Korean Patent Application No. 10-2024-0059810, filed on May 7, 2024, which is hereby incorporated by reference for all purposes as if fully set forth herein.

BACKGROUND

Field

Embodiments relate to a steering system for a vehicle and, more particularly, to a steering system for a vehicle that may reliably absorb collision load by preventing an abnormal motion in which the collision load is not absorbed by a bending plate.

Description of Related Art

In general, a steering column for a vehicle is a device configured to surround a steering shaft which transmits a rotational force generated in response to a driver operating the steering wheel, to a rack-and-pinion device so as to support the rotation of the steering shaft. The steering column is coupled to a vehicle body by a bracket so as to fix the position of the steering shaft.

In the event of a collision, the driver's upper body may hit the steering wheel, which would otherwise lead to serious injury. To prevent this problem, a shock-absorbing steering column which is provided with a collapse function enabling both the steering column and the steering shaft to axially retract is used. In other words, when a collision occurs during the vehicle operation, the driver's upper body hits the steering wheel due to inertia, and when the driver's upper body hits the steering wheel, the steering column and steering shaft provided in the lower part of the steering wheel contract to reduce the impact on the driver.

In general, such a steering column is provided with a bending plate to absorb shock load.

However, in conventional steering columns, an assembly tolerance between parts or the like may cause an abnormal motion in which the transmission path of the shock load bypasses the bending plate and thus may not be absorbed. When such an abnormal motion occurs, there is a risk of a large impact force being applied to the driver if the driver's upper body hits the steering wheel.

SUMMARY

Embodiments are related to a steering system for a vehicle that may reliably absorb collision load by preventing an abnormal motion in which the collision load is not absorbed by a bending plate.

According to embodiments, provided is a steering system for a vehicle, the steering system including: an upper column; a lower column including a pair of distance brackets to which an adjusting bolt is coupled comprised in or coupled to the lower column; a bending plate including fixed gear holes, a first portion coupled to an outer peripheral surface of the upper column, and a second portion bent from the first portion and disposed inside the upper column; and a movable gear coupled to the adjusting bolt coupled to the distance brackets, the movable gear including movable gear teeth provided on a lower surface of the movable gear and configured to be engageable with the fixed gear holes of the bending plate and a protrusion supported on an upper surface of the bending plate.

In addition, according to embodiments, provided is a steering system for a vehicle, the steering system including: an upper column; a lower column including a pair of distance brackets to which an adjusting bolt is coupled are comprised in or coupled to the lower column; a movable gear coupled to the adjusting bolt coupled to the distance brackets, the movable gear including movable gear teeth provided on a lower surface of the movable gear; and a fixed gear (or a bending plate) including a first portion coupled to an outer peripheral surface of the upper column and a second portion bent from the first portion and disposed inside the upper column, wherein the first portion of the bending plate has fixed gear holes, configured to be engageable with the movable gear teeth, and a protrusion supported on the movable gear.

According to exemplary embodiments, the collision load may be reliably absorbed by preventing any abnormal motion in which the collision load is not absorbed by the bending plate.

BRIEF DESCRIPTION OF THE DRAWINGS

The above and other objects, features, and advantages of the present disclosure will be more clearly understood from the following detailed description, taken in conjunction with the accompanying drawings, in which.

DETAILED DESCRIPTION

Figure 1:
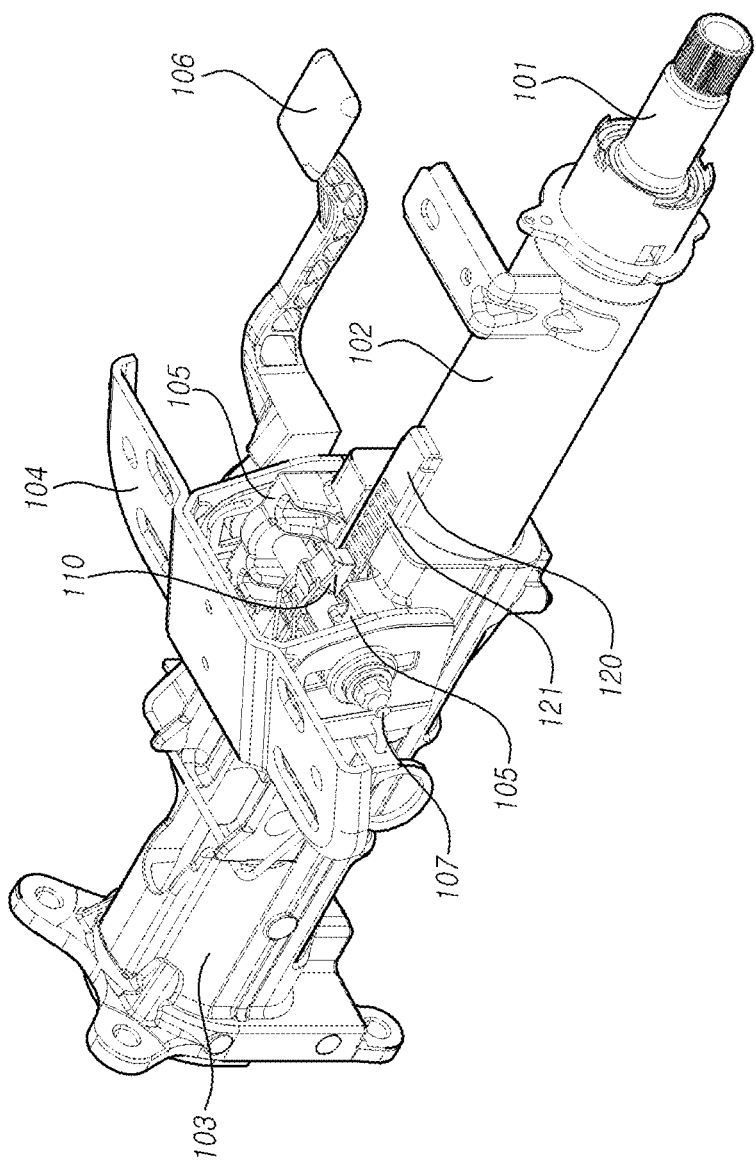
FIG. 1 is a perspective view illustrating a steering system for a vehicle according to embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting", "made up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element, for example, "is connected or coupled to" or "contacts or overlaps" a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after", "subsequent to", "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
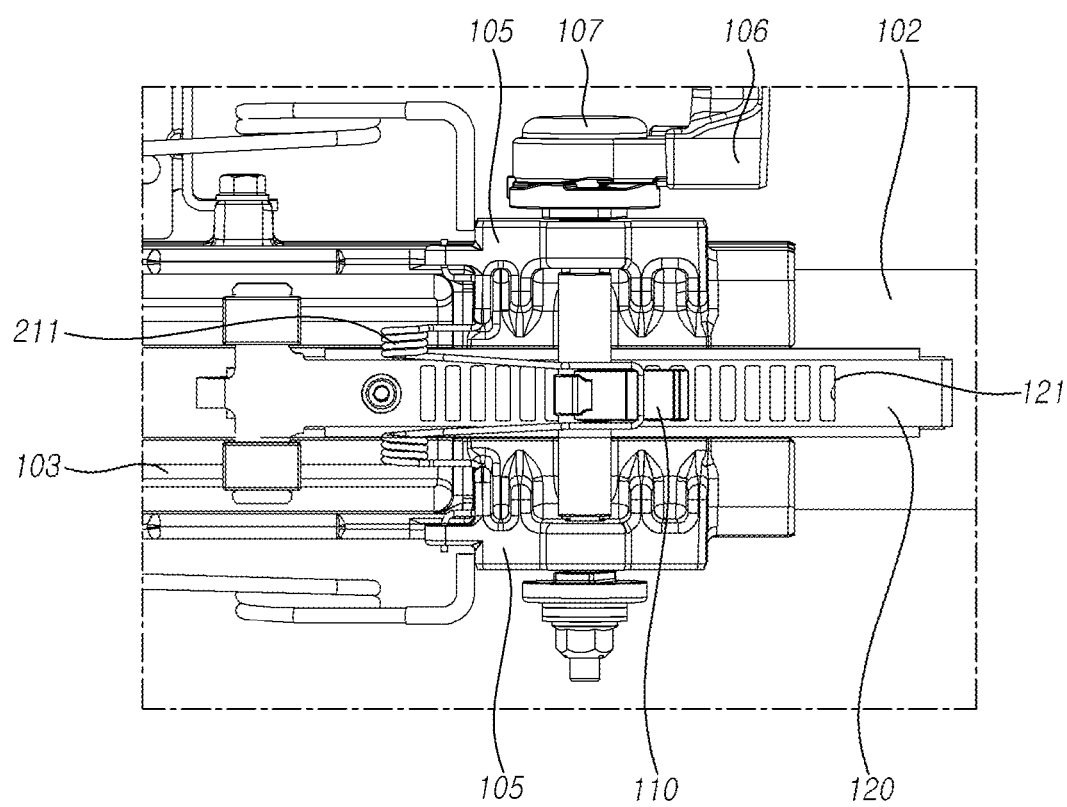
FIG. 2 is a plan view illustrating portions of the steering system for a vehicle steering system for a vehicle.
Figure 3:
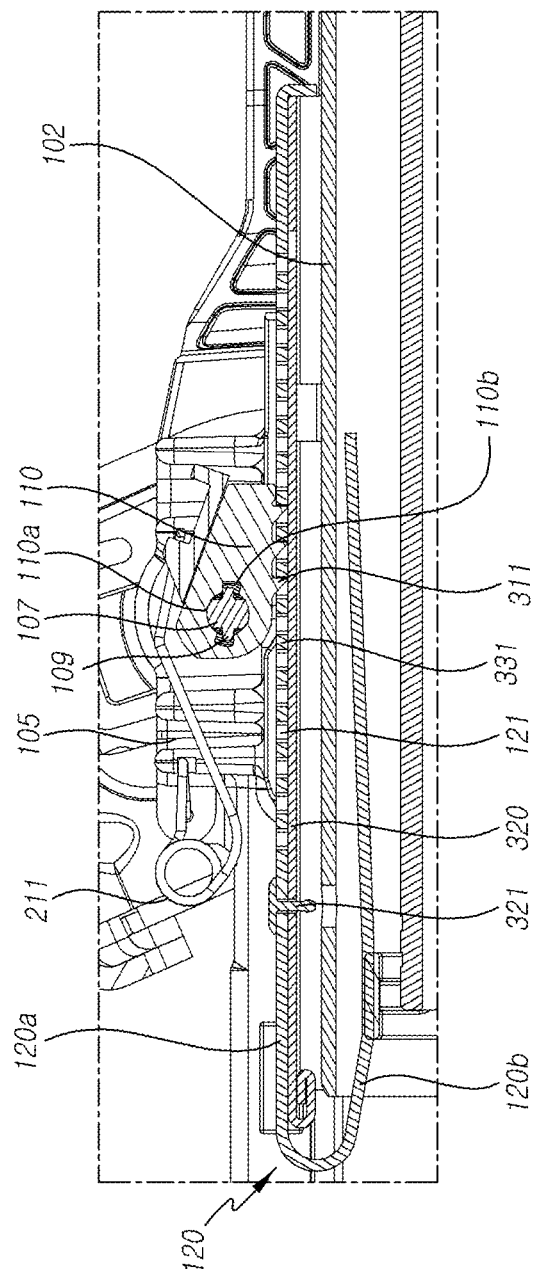
FIG. 3 is a cross-sectional view illustrating portions of the steering system for a vehicle steering system for a vehicle.
Figure 4:
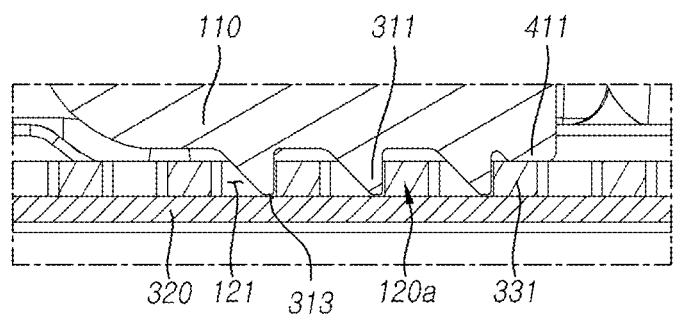
FIG. 4 is a cross-sectional view illustrating portions of the steering system for a vehicle steering system for a vehicle.
Figure 5:
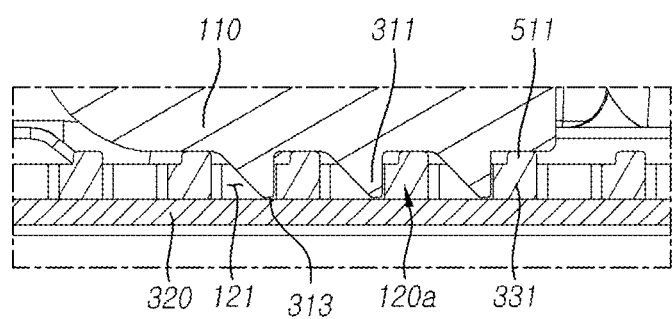
FIG. 5 is a cross-sectional view illustrating portions of the steering system for a vehicle steering system for a vehicle.

FIG. 1 is a perspective view illustrating a steering system for a vehicle according to embodiments, FIG. 2 is a plan view illustrating portions of the steering system for a vehicle steering system for a vehicle, FIG. 3 is a cross-sectional view illustrating portions of the steering system for a vehicle steering system for a vehicle, FIG. 4 is a cross-sectional view illustrating portions of the steering system for a vehicle steering system for a vehicle, and FIG. 5 is a cross-sectional view illustrating portions of the steering system for a vehicle steering system for a vehicle.

First, the present disclosure will be described with reference to FIGS. 1 to 4. According to embodiments, provided is a steering system for a vehicle, the steering system including: an upper column 102; a lower column 103 including a pair of distance brackets 105 to which an adjusting bolt 107 is coupled are comprised in or coupled to the lower column 103; a bending plate 120 including fixed gear holes 121, a first portion 120a coupled to an outer peripheral (or circumferential) surface of the upper column 102, and a second portion 120b bent from the first portion 120a and disposed inside the upper column 102; and a movable gear 110 coupled to the adjusting bolt 107 coupled to the distance brackets 105, the movable gear 110 including movable gear teeth 311 provided on the lower surface of the movable gear 110 and configured to be engageable with the fixed gear holes 121 of the bending plate 120 and a protrusion 411 supported on an upper surface of the bending plate 120.

The steering system for a vehicle according to embodiments includes the upper column 102, the lower column 103, the bending plate 120, and the movable gear 110. The upper column 102 receives the steering shaft 101 therein, and is coupled to the lower column 103 in an axially slidable manner. The lower column 103 is coupled to a mounting bracket 104 fixed to the vehicle body. The driver may lock or unlock a telescoping motion and a tilting motion by operating a lever 106 coupled to the adjusting bolt 107.

The pair of distance brackets 105 facing each other are provided on the outer peripheral surface of the lower column 103, and an adjusting bolt 107 extends through the distance brackets 105 and is coupled to the lower column 103. A fixed cam and a movable cam (not shown) are provided on the end of the adjusting bolt 107, and when the driver operates the lever 106, the adjusting bolt 107 rotates and a tension force is generated or released to lock or unlock the tilting motion.

In addition, the movable gear 110 is provided on an intermediate portion of the adjusting bolt 107, and engages with a first portion 120a of the bending plate 120 coupled to the upper column 102. The movable gear 110 has the movable gear teeth 311 provided on the lower surface. The movable gear 110 is rotated about the adjusting bolt 107 by the adjusting bolt 107 and a torsion spring 211, and engages with, while being supported on, the first portion 120a of the bending plate 120 or is spaced apart from the first portion 120a.

In the bending plate 120, the first portion 120a is coupled to the outer peripheral surface of the upper column 102, and the second portion 120b is bent from the first portion 120a and disposed inside the upper column 102. In a telescoping motion, the movable gear 110 is spaced apart from the first portion 120a of the bending plate 120, and the bending plate 120 slides axially together with the upper column 102. However, in a collapsing motion, the movable gear 110 engages with the first portion 120a of the bending plate 120, and only the upper column 102 slides axially. In the collapsing motion, the upper column 102 (or a coupling bracket 320) slides while supported on a bent portion connecting the first portion 120a and the second portion 120b of the bending plate 120, and the bending plate 120 is plastically deformed by the sliding of the upper column 102 to absorb the collision load.

In other words, the collision load transmitted from the steering wheel to the driver in a collision is transmitted in the order of the upper column, the bending plate, the movable gear, and the adjusting bolt in a normal collapsing motion, and the bending plate is plastically deformed and absorbs the collision load to protect the driver.

However, due to an assembly tolerance (e.g., an assembly tolerance between the adjusting bolt and the movable gear) or the like, a phenomenon (called "stamping") in which the gear teeth of the movable gear forcibly press the upper column (or the coupling bracket described later) may occur. If this phenomenon occurs, a portion of the collision load is transferred directly from the upper column to the movable gear, resulting in an abnormal collapsing motion that bypasses the bending plate. In the abnormal collapsing motion, the bending plate may be unable to sufficiently absorb the collision load, and the driver may be exposed to the risk of a strong impact.

However, the steering system for a vehicle according to embodiments may be provided not only with the movable gear teeth 311 but also with the protrusion 411 on the lower surface of the movable gear 110 to prevent the collision load from bypassing the bending plate 120. The depth to which the movable gear teeth 311 are inserted into the fixed gear holes 121 is limited by the protrusion 411, and thus the collision load is not transmitted directly from the upper column 102 to the movable gear 110.

In an embodiment, the coupling bracket 320 may be provided between the first portion 120a of the bending plate 120 and the upper column 102. That is, the bending plate 120 may be coupled to the upper column 102 by means of the coupling bracket 320. The coupling bracket 320 may be fixed to the upper column 102, and may be welded, for example. The first portion 120a of the bending plate 120 may be coupled to the coupling bracket 320 by means of a fracture member 321. When the collapsing motion is started, the fracture member 321 is fractured under the collision load, the coupling bracket 320 is supported on the bent portion connecting the first portion 120a and the second portion 120b of the bending plate 120, and the bending plate 120 is plastically deformed.

In an embodiment, the movable gear teeth 311 and the coupling bracket 320 are spaced apart from each other. the movable gear teeth 311 are spaced apart from the coupling bracket 320 positioned between the first portion 120a of the bending plate 120 and the upper column 102. That is, due to the formation of the protrusion 411, the movable gear teeth 311 are spaced apart from the coupling bracket 320 while being inserted into the fixed gear holes 121. Thus, the "stamping" phenomenon in which the movable gear teeth 311 forcibly press the coupling bracket 320 due to the assembly tolerance or the like is prevented. Accordingly, the abnormal motion in which at least a portion of the shock load is transmitted directly from the coupling bracket 320 to the movable gear 110 by bypassing the bending plate 120 is prevented.

The structure of the movable gear 110 will be discussed in more detail with reference to FIG. 4. According to an embodiment, the protrusion 411 may be supported on the upper surface of the first portion 120a of the bending plate 120. More specifically, the protrusion 411 of the movable gear 110 is supported on an upper surface of the first portion 120a of the bending plate 120 coupled to the outer peripheral surface of the upper column 102. the first portion 120a of the bending plate 120 includes connectors 331 provided between the fixed gear holes 121, and the protrusion 411 may be supported on the upper surface of the connectors 331. When the protrusion 411 is supported on the upper surface of the connectors 331, the movable gear teeth 311 are deeply inserted into the fixed gear holes 121 and are prevented from being supported or stamped on the upper column 102 or the coupling bracket 320.

In an embodiment, in a state where the protrusion 411 is supported on the bending plate 120, the lower surface of the movable gear 110 and the upper surface of the first portion 120a of the bending plate 120 may be parallel. a lower surface of the movable gear 110 is arranged to be parallel to the upper surface of the first portion 120a of the bending plate 120 coupled to the outer peripheral surface of the upper column 102. That is, the height to which the protrusion 411 protrudes from the lower surface of the movable gear 110 may be the distance in a state where the lower surface of the movable gear 110 and the upper surface of the first portion 120a of the bending plate 120 are parallel. As shown, the movable gear teeth 311 may be provided in a plurality, and since the lower surface of the movable gear 110 and the upper surface of the first portion 120a of the bending plate 120 are parallel in a state where the protrusion 411 is supported on the bending plate 120, the depths to which the movable gear teeth 311 are inserted into the corresponding fixed gear holes 121 are the same. Accordingly, the collision load transmitted to the movable gear 110 from the first portion 120a of the bending plate 120 may be uniformly distributed to the movable gear teeth 311 inserted at the same depth into the fixed gear holes 121, thereby preventing the load from being concentrated in a particular portion.

In addition, the lower surface of the movable gear 110 and the upper surface of the first portion 120a of the bending plate 120 are spaced apart parallel to each other by the protrusion 411, and only the ends of the movable gear teeth 311 are inserted into the fixed gear holes 121 and are axially supported on the first portion 120a of the bending plate 120. Accordingly, the movable gear teeth 311 may be smoothly disengaged from the fixed gear holes 121 when the movable gear 110 is rotated (counterclockwise with respect to the figure).

According to an embodiment, a coupling hole 110a into which the adjusting bolt 107 is inserted to be coupled thereto may be provided in a first portion of the movable gear 110. The coupling hole 110a is provided in the first portion of the movable gear 110, which is rotated about the center of the coupling hole 110a to engage with the fixed gear holes 121 or be spaced apart from the fixed gear holes 121.

Here, the coupling hole 110a of the movable gear 110 comprises an obstructing groove 110b provided on an inner surface of the coupling hole 110a of the movable gear 110, and the adjusting bolt 107 comprises an obstructing protrusion 109 protruding radially outward and inserted in the obstructing groove 110b of the movable gear 110. Accordingly, when the adjusting bolt 107 is rotated in one direction or the opposite direction, the movable gear 110 is rotated in one direction or the opposite direction together with the adjusting bolt 107.

In an embodiment, the movable gear teeth 311 may be spaced apart in the direction from a first side to a second side on the lower surface of the movable gear 110, and may be provided in a plurality. The figure shows an embodiment in which three movable gear teeth 311 are provided in the direction from the first side to the second side (i.e., in the direction from left to right in the figure) on the lower surface of the movable gear 110. Each of the movable gear teeth 311 may be configured such that a beveled surface and a perpendicular surface substantially is perpendicular to the lower surface of the movable gear 110 so that the movable gear teeth 311 are easily inserted into the fixed gear holes 121 while being axially supported on the bending plate 120.

Here, at least one of the movable gear teeth 311 has a beveled surface, a perpendicular surface substantially perpendicular to the lower surface of the movable gear 110, and a curved surface between the beveled surface and the perpendicular surface. each of the movable gear teeth 311 has a curved surface on an end 313 where the beveled first surface and the perpendicular surface. This curved surface of the end 313 of each movable gear tooth 311 prevents the so-called stamping phenomenon in which the movable gear tooth 311 from is forcibly pressed against the coupling bracket 320.

In an embodiment, the protrusion 411 is located farther than the movable gear teeth 311 from the coupling hole 110a. the protrusion 411 may be located at an end of the second side on the lower surface of the movable gear 110. That is, the protrusion 411 may be located at the farthest position of the second side on the lower surface of the movable gear 110. If the lower surface of the movable gear 110 is provided with a plurality of movable gear teeth 311 in the direction from the first side to the second side, the protrusion 411 may be located on the second side of the last movable gear teeth 311. Thus, when the movable gear 110 is rotated in the direction of engaging with the fixed gear holes 121, the insertion of the movable gear teeth 311 into the fixed gear holes 121 is not obstructed by the protrusion 411. In other words, the movable gear teeth 311 are inserted into the fixed gear holes 121 sequentially starting with one movable gear tooth of the movable gear teeth 311 closest to the coupling hole 110a. Since the protrusion 411 is located at the farthest position of the second side the second side on the lower surface of the movable gear 110, the protrusion 411 is not supported on the upper surface of the first portion 120a of the bending plate 120 even when the movable gear tooth 311 farthest from the coupling hole 110a is inserted into a corresponding fixed gear hole of the fixed gear holes 121. Accordingly, the insertion of the movable gear teeth 311 into the fixed gear holes 121 may be accomplished smoothly. In addition, as described above, when the protrusion 411 is supported on the upper surface of the first portion 120a of the bending plate 120, the depth to which the movable gear teeth 311 are inserted into the fixed gear holes 121 is limited.

Next, the present disclosure will be described with reference to FIG. 5. The features the same as those of the foregoing embodiments will be readily understood by reference to FIGS. 1 to 4 in which the same drawing symbols are used, and detailed descriptions thereof will be omitted.

According to the embodiments, provided is a steering system for a vehicle, the steering system including: an upper column 102; a lower column 103 including a pair of distance brackets 105 to which an adjusting bolt 107 is coupled are comprised in or coupled to the lower column 103; a movable gear 110 coupled to the adjusting bolt 107 coupled to the distance brackets 105, the movable gear 110 including movable gear teeth 311 provided on the lower surface of the movable gear 110; and a bending plate 120 including a first portion 120a coupled to an outer peripheral (or circumferential) surface of the upper column 102 and a second portion 120b bent from the first portion 120a and disposed inside the upper column 102, wherein the first portion 120a of the bending plate has fixed gear holes 121 into which the movable gear teeth 311, and a protrusion 511 supported on the movable gear 110.

The steering system for a vehicle according to embodiments may be provided with the protrusion 511 on the upper surface of the first portion 120a of the bending plate 120 to prevent the collision load from bypassing the bending plate 120. The depth to which the movable gear teeth 311 are inserted into the fixed gear holes 121 is limited by the protrusion 511, and thus the collision load is not transmitted directly from the upper column 102 to the movable gear 110.

In an embodiment, the coupling bracket 320 may be provided between the first portion 120a of the bending plate 120 and the upper column 102. That is, the bending plate 120 may be coupled to the upper column 102 by means of the coupling bracket 320. The coupling bracket 320 is fixed to the upper column 102, and may be welded, for example. The first portion 120a of the bending plate 120 may be coupled to the coupling bracket 320 by means of a fracture member 321. When the collapsing motion is started, the fracture member 321 is fractured under the collision load, the coupling bracket 320 is supported on the bent portion connecting the first portion 120a and the second portion 120b of the bending plate 120, and the bending plate 120 is plastically deformed.

In an embodiment, the movable gear teeth 311 and the coupling bracket 320 are spaced apart from each other. the movable gear teeth 311 are spaced apart from the coupling bracket 320 positioned between the first portion 120a of the bending plate 120 and the upper column 102. That is, due to the formation of the protrusion 411, the movable gear teeth 311 are spaced apart from the coupling bracket 320 while being inserted into the fixed gear holes 121. Thus, the "stamping" phenomenon in which the movable gear teeth 311 forcibly press the coupling bracket 320 due to the assembly tolerance or the like is prevented.

Accordingly, the abnormal motion in which at least a portion of the shock load is transmitted directly from the coupling bracket 320 to the movable gear 110 by bypassing the bending plate 120 is prevented.

In an embodiment, the protrusion 511 of the first portion 120a of the bending plate may be supported on a lower surface of the movable gear 110. More specifically, the lower surface of the movable gear 110 has one or more movable gear teeth 311 provided thereon, and the protrusion 511 may be supported on a portion of the lower surface of the movable gear 110 without the movable gear teeth 311. When the protrusions 511 are supported on the lower surface of the movable gear 110, the movable gear teeth 311 may be deeply inserted into the fixed gear holes 121 and are prevented from being supported or stamped on the upper column 102 or the coupling bracket 320.

In an embodiment, in a state where the protrusion 511 is supported on the movable gear 110, the lower surface of the movable gear 110 and the upper surface of the first portion 120a of the bending plate 120 may be parallel. a lower surface of the movable gear 110 is arranged to be parallel to the upper surface of the first portion 120a of the bending plate 120 coupled to the outer peripheral surface of the upper column 102. That is, the height to which the protrusion 511 protrudes from the upper surface of the first portion 120a of the first portion 120a may be the distance in a state where the lower surface of the movable gear 110 and the upper surface of the first portion 120a of the bending plate 120 are parallel. Accordingly, the depths to which the movable gear teeth 311 are inserted into the corresponding fixed gear holes 121 are the same, and the load may be prevented from being from being concentrated in a particular portion.

In an embodiment, the fixed gear holes 121 may be spaced apart from the first portion 120a of the bending plate 120 in the direction from a first side to a second side, and may be provided in a plurality. Accordingly, a telescoping motion may be performed by adjusting the contracted or extended position of the steering column depending on the engagement position of the movable gear 110.

In an embodiment, the bending plate 120 may include a plurality of connectors 331 provided between the fixed gear holes 121, and the protrusions 511 may protrude from the upper surface of the connectors 331 of the bending plate 120. The connectors 331 may be located between adjacent fixed gear holes 121, and may be provided in a plurality like the fixed gear holes 121. The protrusions 511 may be provided on the connectors 331, respectively.

In an embodiment, the protrusion 511 may be located at an end of a second side on the upper surface of the connectors 331. That is, the protrusion 511 may be located at the rightmost side on the upper surface of the connectors 331 with respect to the figure. Thus, when the movable gear 110 is rotated in the direction of engaging with the fixed gear holes 121 or in the opposite direction, the insertion of the movable gear teeth 311 into the fixed gear holes 121 or the disengagement of the movable gear teeth 311 from the fixed gear holes 121 is not obstructed by the protrusion 511. Accordingly, the insertion of the movable gear teeth 311 into the fixed gear holes 121 may be accomplished smoothly. As described above, the protrusion 511 is supported on the upper surface of the first portion 120a of the bending plate 120, and the depth to which the movable gear teeth 311 are inserted into the fixed gear holes 121 is limited.

According to the steering system for a vehicle having such a shape, the collision load may be reliably absorbed by preventing any abnormal motion in which the collision load is not absorbed by the bending plate.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering system for a vehicle, the steering system comprising:
 an upper column;
 a lower column, wherein a pair of distance brackets to which an adjusting bolt is coupled are comprised in or coupled to the lower column;
 a bending plate comprising fixed gear holes, a first portion coupled to an outer peripheral surface of the upper column, and a second portion bent from the first portion and disposed inside the upper column; and
 a movable gear coupled to the adjusting bolt coupled to the distance brackets, the movable gear comprising movable gear teeth provided on a lower surface of the movable gear and configured to be engageable with the fixed gear holes of the bending plate and a protrusion supported on an upper surface of the bending plate.

2. The steering system of claim 1, further comprising a coupling bracket provided between the first portion of the bending plate and the upper column.

3. The steering system of claim 1, wherein the movable gear teeth are spaced apart from the coupling bracket positioned between the first portion of the bending plate and the upper column.

4. The steering system of claim 1, wherein the protrusion of the movable gear is supported on an upper surface of the first portion of the bending plate coupled to the outer peripheral surface of the upper column.

5. The steering system of claim 4, wherein a lower surface of the movable gear is arranged to be parallel to the upper surface of the first portion of the bending plate coupled to the outer peripheral surface of the upper column.

6. The steering system of claim 1, wherein the movable gear comprises a coupling hole in which the adjusting bolt is inserted.

7. The steering system of claim 6, wherein the coupling hole of the movable gear comprises an obstructing groove on an inner surface of the coupling hole of the movable gear, and the adjusting bolt comprises an obstructing protrusion protruding radially outward and inserted in the obstructing groove of the movable gear.

8. The steering system of claim 6, wherein the movable gear teeth are positioned to be spaced apart from each other.

9. The steering system of claim 6, wherein the protrusion is located farther than the movable gear teeth from the coupling hole.

10. The steering system of claim 1, wherein at least one of the movable gear teeth has a beveled surface, a perpendicular surface substantially perpendicular to the lower surface of the movable gear, and a curved surface between the beveled surface and the perpendicular surface.

11. A steering system for a vehicle, the steering system comprising:
 an upper column;
 a lower column, wherein a pair of distance brackets to which an adjusting bolt is coupled are comprised in or coupled to the lower column;
 a movable gear coupled to the adjusting bolt coupled to the distance brackets, the movable gear comprising movable gear teeth provided on a lower surface of the movable gear; and
 a bending plate comprising a first portion coupled to an outer peripheral surface of the upper column and a second portion bent from the first portion and disposed inside the upper column, wherein the first portion of the bending plate has fixed gear holes, configured to be engageable with the movable gear teeth, and a protrusion supported on the movable gear.

12. The steering system of claim 11, further comprising a coupling bracket provided between the first portion of the bending plate and the upper column.

13. The steering system of claim 11, wherein the movable gear teeth are spaced apart from the coupling bracket positioned between the first portion of the bending plate and the upper column.

14. The steering system of claim 11, wherein the protrusion of the first portion of the bending plate is supported on a lower surface of the movable gear.

15. The steering system of claim 14, wherein a lower surface of the movable gear is arranged to be parallel to an upper surface of the first portion of the bending plate coupled to the outer peripheral surface of the upper column.

16. The steering system of claim 11, wherein the fixed gear holes are provided at the first portion of the bending plate, and are spaced apart from each other.

17. The steering system of claim 16, wherein the bending plate comprises a plurality of connectors provided between the fixed gear holes, and the protrusion protrudes from an upper surface of the connectors of the bending plate.

18. The steering system of claim 17, wherein the protrusion is located at an end of the upper surface of the connectors.

19. The steering system of claim 11, wherein the movable gear comprises a coupling hole in which the adjusting bolt is inserted, the coupling hole of the movable gear comprises an obstructing groove provided on an inner surface of the coupling hole of the movable gear, and the adjusting bolt comprises an obstructing protrusion protruding radially outward and inserted in the obstructing groove of the movable gear.

20. The steering system of claim 11, wherein at least one of the movable gear teeth has a beveled surface, a perpendicular surface substantially perpendicular to the lower surface of the movable gear, and a curved surface between the beveled first and the perpendicular surface.

* * * * *